(12) United States Patent
Burr

(10) Patent No.: US 7,177,594 B2
(45) Date of Patent: Feb. 13, 2007

(54) CONTROLLING COMMUNICATIONS BETWEEN DEVICES WITHIN A MOBILE AND AD HOC NETWORK

(75) Inventor: Jeremy Burr, Portland, OR (US)

(73) Assignee: Intel Corporation, Santa Clara, CA (US)

(*) Notice: Subject to any disclaimer, the term of this patent is extended or adjusted under 35 U.S.C. 154(b) by 709 days.

(21) Appl. No.: 09/948,300

(22) Filed: Sep. 6, 2001

(65) Prior Publication Data

US 2003/0045272 A1   Mar. 6, 2003

(51) Int. Cl.
*H04B 7/00* (2006.01)

(52) U.S. Cl. ............ 455/41.2; 455/410; 455/411; 455/445; 455/518; 455/11.1; 455/514; 370/338; 370/351; 370/352; 370/400; 370/408; 709/238; 709/239

(58) Field of Classification Search ........ 455/410–411, 455/445, 11.1, 13.1, 41.3, 507, 514, 515–520, 455/502, 41.1–2; 370/338, 351–352, 400–408; 709/203, 208–209, 211–215, 238–239, 248–249
See application file for complete search history.

(56) References Cited

U.S. PATENT DOCUMENTS 5,742,905 A * 4/1998 Pepe et al. .................. 455/461

FOREIGN PATENT DOCUMENTS

| EP | 1 107 512 A | 6/2001 |
|----|-------------|--------|
| GB | 2 258 584 A | 2/1993 |

(Continued)

OTHER PUBLICATIONS

Jereby Burr, U.S. Appl. No. 09/930,779, filed Aug. 15, 2001, entitled "Establishing Communications Between Devices Within a Mobile Ad Hoc Network".

(Continued)

*Primary Examiner*—Matthew D. Anderson
*Assistant Examiner*—Tuan Tran
(74) *Attorney, Agent, or Firm*—Pearl Cohen Zedek Latzer, LLP

(57) ABSTRACT

A mobile ad hoc network may be established between a plurality of devices that have common contacts on their contact lists. The contact lists may be conventional contacts stored in a list of contacts on a scheduling and information management or other software packages in one embodiment. Communications with various devices is limited to those devices listed on the list of contacts. Modification of those lists of contacts is controlled on a password-protected basis in one embodiment. Thus, a parent, for example, may limit the ability of child users to contact or be contacted by and communicate with unauthorized persons.

24 Claims, 8 Drawing Sheets

U.S. PATENT DOCUMENTS

| | | | |
|---|---|---|---|
| 6,400,940 B1* | 6/2002 | Sennett | 455/414.1 |
| 6,463,276 B1* | 10/2002 | Jonsson | 455/410 |
| 6,590,928 B1* | 7/2003 | Haartsen | 375/134 |
| 6,690,918 B2* | 2/2004 | Evans et al. | 455/41.2 |
| 6,856,818 B1* | 2/2005 | Ford | 455/558 |
| 2001/0002912 A1 | 6/2001 | Tony et al. | |
| 2002/0090912 A1* | 7/2002 | Cannon et al. | 455/41 |
| 2002/0103862 A1 | 8/2002 | Burr | |
| 2003/0018708 A1* | 1/2003 | Hlasny | 709/203 |
| 2003/0036350 A1* | 2/2003 | Jonsson et al. | 455/41 |
| 2004/0029572 A1* | 2/2004 | Nerot | 455/414.3 |

FOREIGN PATENT DOCUMENTS

| | | |
|---|---|---|
| WO | WO 99/18704 | 4/1999 |
| WO | WO 99 18704 A | 4/1999 |
| WO | WO 01/31898 | 5/2001 |

OTHER PUBLICATIONS

Jeremy Burr, U.S. Appl. No. 09/948,270, filed Sep. 6, 2001, entitled "Establishing Communications Between Devices Within a Mobile Ad Hoc Network Based on User Attributes".

S. Corson et al., *Mobile Ad Hoc Networking (MANET): Routing Protocol Performance Issues and Evaluation Considerations*, Network Working Group, Request for Comments RFC 2501, Jan. 1999, pp. 1-9.

R. Ramanujan et al., *Techniques For Intrusion-Resistant Ad Hoc Routing Algorithms (TIARA)*, IEEE 2000, Architecture Technology Corp., Eden Prairie, Minnesota, US, pp. 660-664.

U.S. Appl. No. 09/930,779, filed Aug. 15, 2001, Burr.

Hyung Kook Jun et al., "Multi-Hop Cluster Routing Protocol in Wireless Ad-hoc Networks", Proceedings of the 143th KIPS Spring Conference, vol. 7,No. 1, Apr. 2000.

* cited by examiner

X's CONTACT LIST
Y, ...

Y's CONTACT LIST
X,Z, ...

Z's CONTACT LIST
Y,A, ...

A's CONTACT LIST
Z, ...

CONTROLLING COMMUNICATIONS BETWEEN DEVICES WITHIN A MOBILE AND AD HOC NETWORK

BACKGROUND

This invention relates generally to communication systems and particularly to establishing links between individuals on a wireless communication network.

A mobile ad hoc network (MANET) is an autonomous system of mobile routers and associated hosts connected by wireless links, the union of which forms an arbitrary graph. The routers are free to move randomly and organize themselves arbitrarily. Thus, the MANET wireless topology may change rapidly and unpredictably. Such a network may operate in a stand-alone fashion or may be connected to a larger Internet.

A MANET consists of mobile platforms called nodes that are free to move about arbitrarily. MANET nodes may be equipped with wireless transmitters and receivers using antennas which may be omnidirectional (broadcast), highly directional (point-to-point), steerable, or some combination thereof. Generally MANETs are bandwidth-constrained variable-capacity links. Often the nodes are energy-constrained since they may be portable and rely on battery power.

An implicit assumption within a MANET is that every node within the network may wish to communicate with every other node within the network. The MANET protocol defines all devices as routers, and then goes about trying to comprehend how each router maintains real time knowledge about the existence of other routers within the network. This becomes an exponential task to manage as the network increases in size. This problem is compounded by the ability of the nodes to dynamically enter or leave the network in an "ad hoc" fashion. The ad hoc nature of the network creates an onerous network management problem, flooding the network with status packages requiring constant updates.

There are a number of postulated causes for MANET network failure. The network updates may not be received fast enough to keep up with dynamic changes. The information about which nodes are currently connected to the network may become so out of date that it is no longer trustworthy. The network updates may consume so much of the available bandwidth that there may be insufficient residual bandwidth for actual data to traverse the network. The battery life of each node may be insufficient because of the volume of update traffic, which requires the node to be almost permanently communicating with other devices in order to obtain network status information. A routing table that contains the information about how to traverse from one node to another may become so large that it may not be stored in the available memory capacity of nodes within the network.

Thus, there is a need for better ways to manage a mobile ad hoc network.

DETAILED DESCRIPTION

Figure 1:
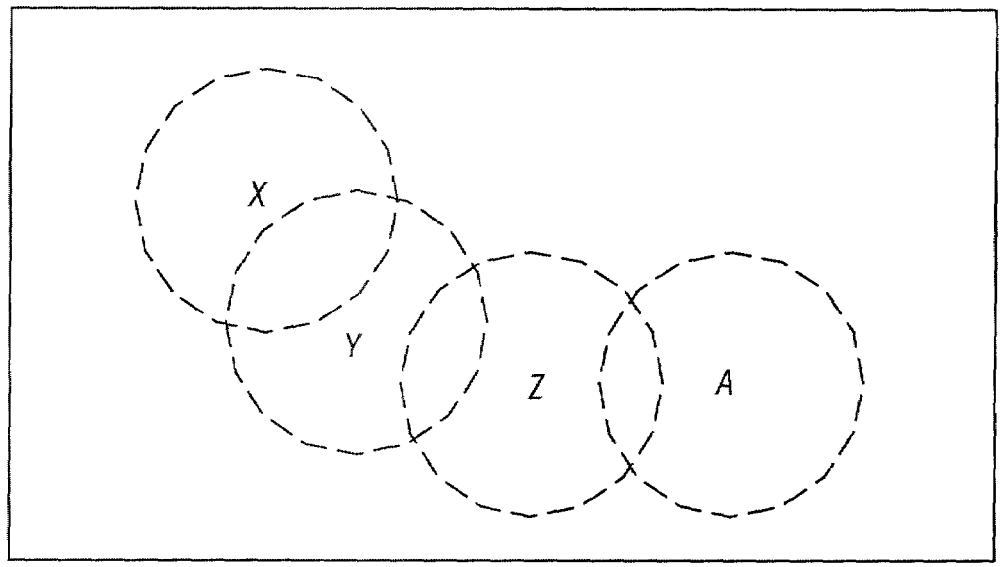
FIG. 1 is a schematic depiction of a mobile ad hoc network in accordance with one embodiment of the present invention.

Referring to FIG. 1, a mobile ad hoc network (MANET) may be established between a plurality of mobile devices, such as the devices X, Y, Z and A. Each device X, Y, Z and A may be a wireless transceiver. The wireless transceivers may use any available wireless protocol including the Bluetooth specification (Specification of the Bluetooth System, Version 1.1, Feb. 22, 2001) and 802.11 specification (IEEE Standard 802.11 available from the Institute of Electrical and Electronics Engineers, New York, N.Y.). In some embodiments they may be mobile battery powered devices. Each device generally has a limited range indicated by the dashed circles.

Instead of trying to communicate with every single device in the network, which commonly may be a very large number of devices, a network is established with a smaller group of devices within the network. Each device includes a contact list. A contact list may be a list of individuals with whom the device has communicated in the past. Contact lists are commonly stored on computers. For example, on Microsoft Explorer®, contact lists may be maintained. Similarly, lists of addressees may be maintained with a variety of software including scheduling and information management software. Thus, each device X, Y, Z or A in this example, may have its own contact list.

In order to establish a network, each of the devices may exchange its contact list with any in-range devices. For example, the devices X and Y are both in-range and may exchange contact lists. Each device X or Y may then determine, in one embodiment, whether they may have common entries on their contact lists. This common entry information may be stored. Thereafter, the devices Y and Z may exchange contact lists and determine which devices are in common on each of their contact lists. In addition, the device Y may store information about which contacts on Z's contact list are also on X's contact list. The devices Z and A may then exchange contact lists and a determination may be made about what are their common contacts. Z may also determine which contacts on A's list are also on Y's list.

Thus, as shown in FIG. 1, the device X's contact list includes at least Y. The Y's contact list includes at least X and Z and Z's contact list includes at least Y and A. Finally, A's contact list includes at least Z.

In accordance with one embodiment of the present invention, a MANET may be established within a smaller defined group, which is therefore much more manageable. The smaller defined group may be established by exchanging contact lists and establishing communication links from a first station, such as the station X with other stations which may or may not be in-range, but are determined to have common contacts in their contact lists. Thus, even though the device Z is out-of-range from the device X, the device X may establish a communication link through their common contact Y, to out-of-range device Z and ultimately to out-of-range device A.

Devices determine which common contacts they have and this common contact information may traverse the network as the network grows over time. This common contact information may be stored in a routing table, which in one embodiment may be available on each device within the MANET. Also, stored is information about whether or not a particular device is currently on-line.

In some embodiments, still additional profile information may be transferred and stored, such as the device's identifier, a profile of personal information about the device owner, alternative routes to each device on-line, and identifying adjacent devices for a first hop and the number of hops to the destination device. Also, stored in some embodiments, may be information about the type of each device, such as whether it is an audio, text, phone, still picture capable device, and the like.

This shared information may traverse across the network by being progressively exchanged between in-range devices. As status information changes, for example, whether or not a given device is on-line or not, that information may be shared around the network.

Figure 2:
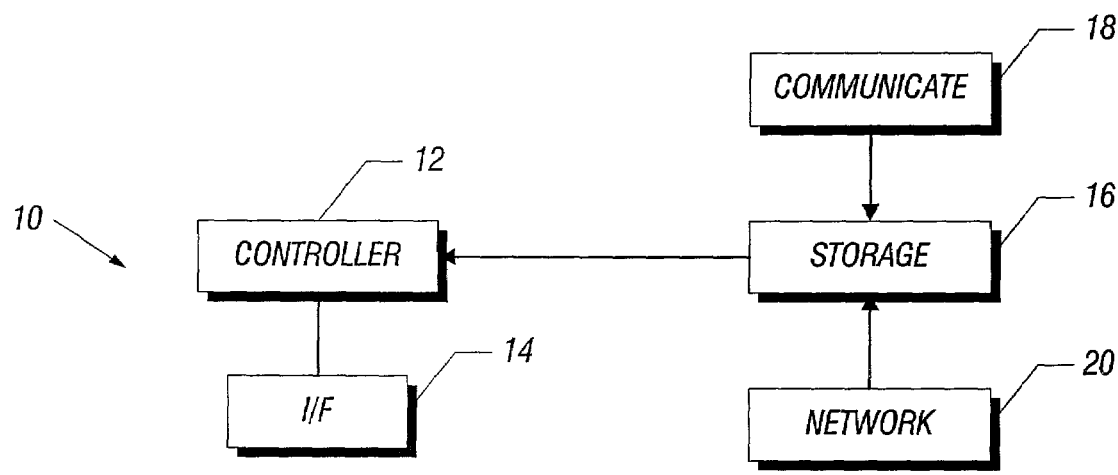
FIG. 2 is a block depiction of a node in a mobile ad hoc network in accordance with one embodiment of the present invention.

A device 10 such as one of the devices indicated as X, Y, Z or A in FIG. 1 may include a controller 12 as indicated in FIG. 2. The controller 12 may communicate with a wireless interface 14. It may also communicate with a storage device 16 that stores the communicate software 18 and the network software 20 in accordance with one embodiment.

Figure 3:
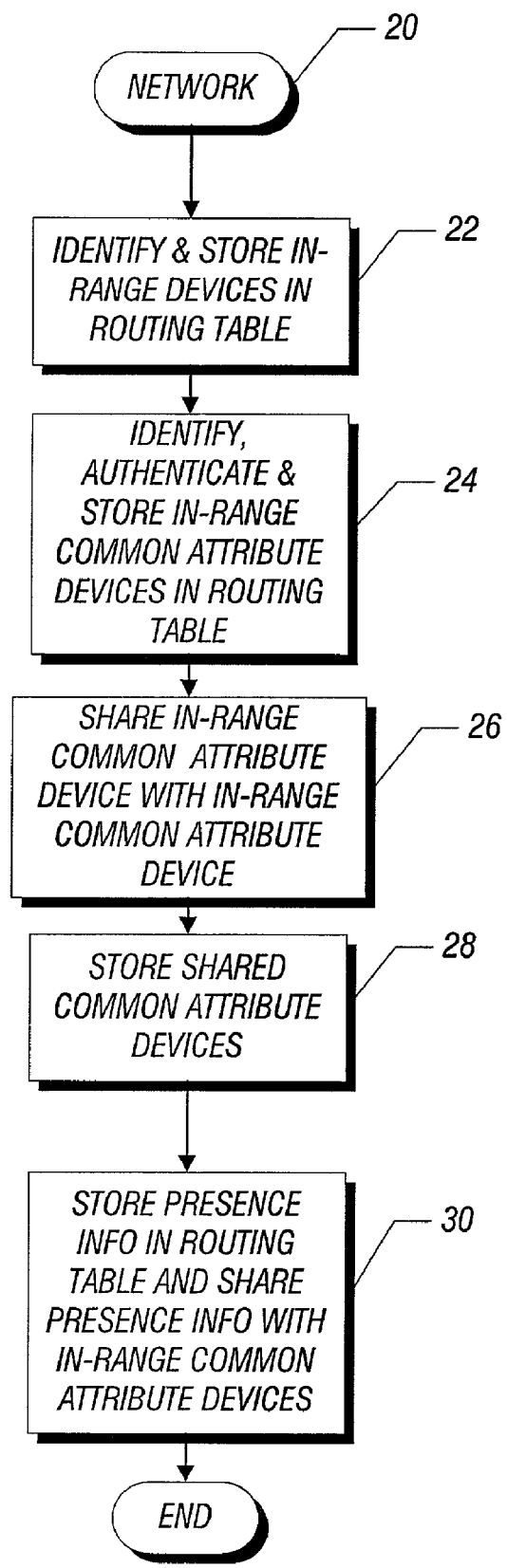
FIG. 3 is a flow chart for software in accordance with one embodiment of the present invention.

The network software 20 shown in FIG. 3, in one embodiment, begins by identifying and storing in-range devices as indicated in block 22. This in-range device information may be stored in a routing table stored in the storage 16 in one embodiment. Next, common contacts between in-range devices are determined. This may be done by exchanging common contact lists, identifying contacts that are common, and storing that information in the routing table as indicated in block 24.

The common contacts determined between a first set of devices may then be shared with other in-range devices that are common contacts as indicated in block 26. The mutual common contacts are then stored in the routing table.

Next, the mutual common contacts, whether they are in-range or not, are stored in the routing table as indicated in block 28. The out-of-range common contacts may be obtained by the progressive sharing throughout the network of information of common contacts between devices that are in-range. Eventually this information reaches out-of-range common contacts.

Finally, the status information for each device in the network of common contacts is stored. This status information may include whether a particular device is currently active or available for receiving communications and that information is similarly shared with in-range common contacts, eventually reaching out-of-range common contacts as indicated in block 30.

Thus, through the sharing of information between common contacts, the nature of the network and the status of each device in the network may be dynamically updated on an ongoing basis. As soon as one device is determined to no longer be active, that information may be gleaned by in-range devices that share the information with in-range devices until the information eventually progresses throughout the network. The common contacts limit the number of devices so that MANET management becomes more workable. Each device may, therefore, develop its own unique subset of the global MANET network. By establishing a MANET of manageable size using common contacts, a more efficient network may be achieved especially because of the likelihood that the common contacts will want to contact each other anyway. In other words, a MANET of manageable size is achieved among individuals who are likely to contact each other anyway, avoiding the storage of connection information between devices that are less likely to communicate with one another.

Figure 4:
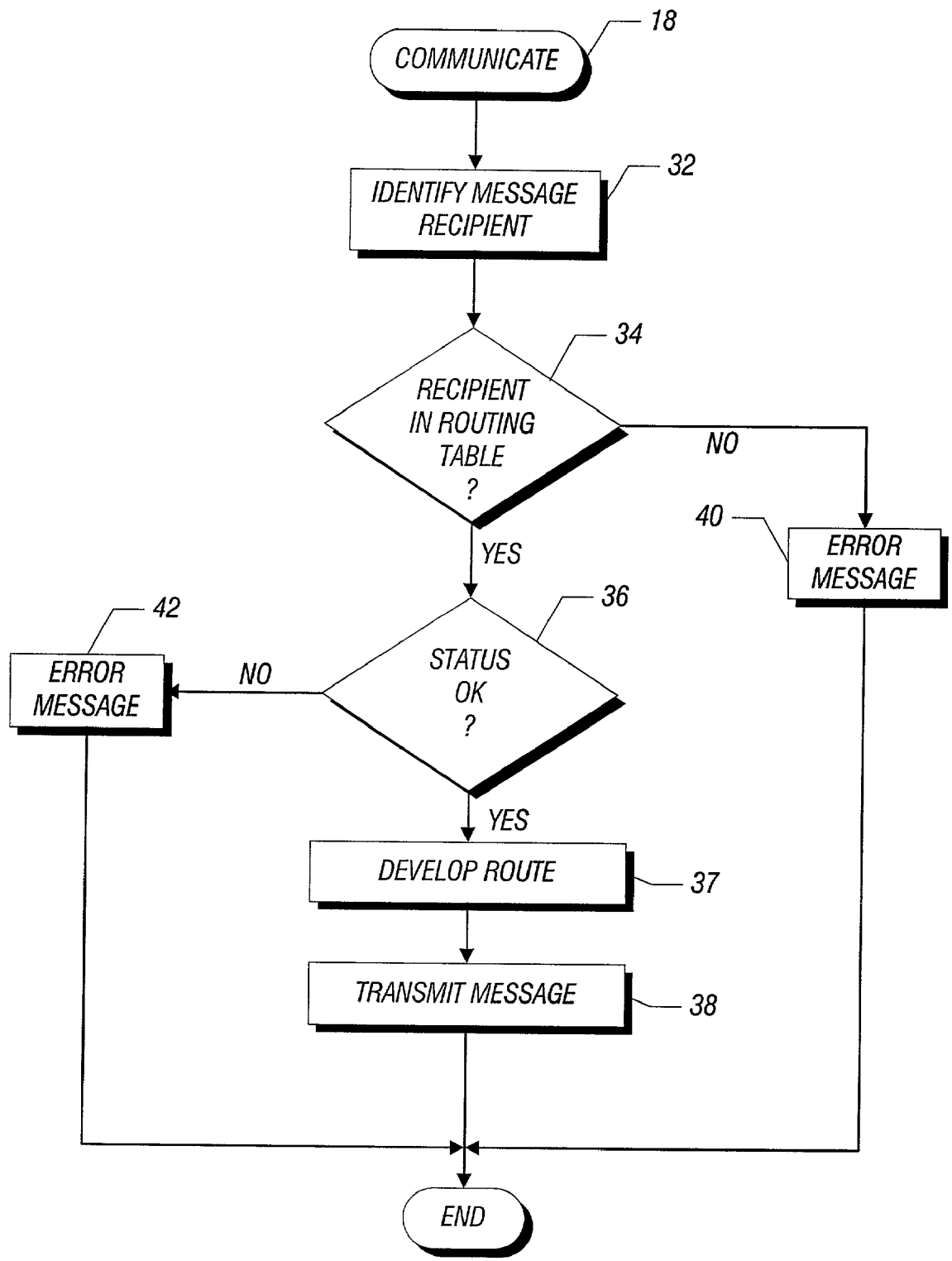
FIG. 4 is a flow chart in accordance with another embodiment of the present invention.
Figure 5:
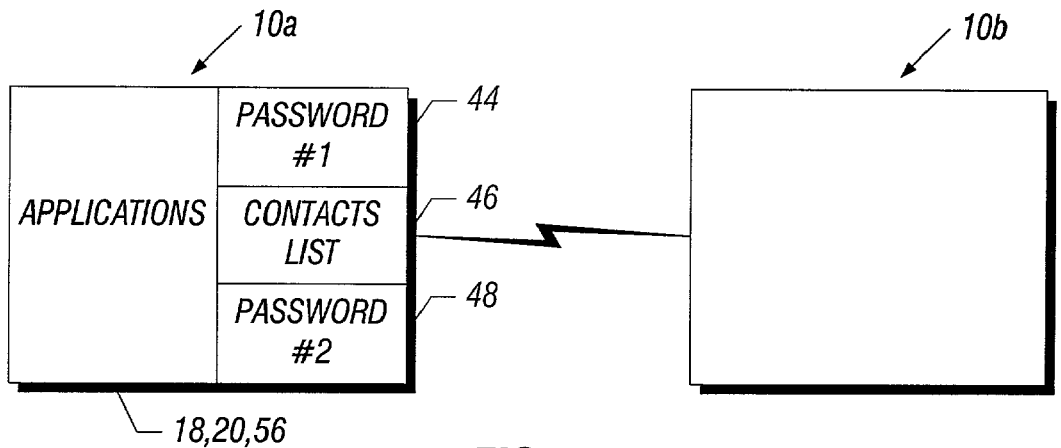
FIG. 5 is a schematic depiction of one embodiment of the present invention.

The communicate software 18, shown in FIG. 4, begins by identifying a recipient of a potential message as indicated in block 32 in one embodiment. A check at diamond 34 determines whether the intended recipient is in the routing table. If so, a check of the status information (diamond 36) associated with the intended recipient determines whether or not the device is currently active. If not, an error message may be generated as indicated in block 42.

If the device status is okay a message may be transmitted to the recipient via a series of in-range devices over a path that was stored in the routing table of those devices, as indicated in block 38. If an intended recipient is not on the routing table, an error message may be generated as indicated in block 40. This means that the device is both not in-range and not a common contact with a series of devices that can define a plurality of in-range links to that device.

Access to a particular device 10 may be limited. Also, those entities that are on the authorized contact list may be controlled. Controlling access to the device 10 means controlling which users can pick up a device 10 and initiate communications. This may be important because, if the device is lost, an unauthorized person may utilize the device 10 to make contact with authorized individuals. In some cases, the unauthorized persons may be adults who attempt to improperly communicate with children. Thus, a password 44 may be provided on the device 10a that also includes the applications 18, 20 and 56. A contact list 46 may be stored as data on the device 10a as well. Similarly, each device with which the device 10a communicates, such as the device 10b, also includes a password 44 and a contact list 46. Thus, each device 10, in one embodiment, may be adapted to prevent communications by anyone who may find the device 10.

Moreover, the device 10a also includes a second password 48. This password 48 is provided to change the contacts list 46 in one embodiment. Likewise, each device 10 with which the device 10a may communicate may also have a contacts list 46 and a password 48 to enable one to change that contacts list. In such case, in order to change the contact list 46, the user will be asked for a password. Upon providing the appropriate password 48, the contact list may be changed.

In one usage model, a child may use the device 10a or 10b. The child may know the password 44 and may use it to sign on to the device 10a or 10b. If the child user wants to add a new contact to his or her contact list 46, the child may provide the device 10 to the child's parents who then enter the password 48 and make the appropriate modification, if approved. In this usage model, the child's parents may then control whom the child is able to communicate with. The child will be unable to initiate or receive communications with individuals not on the parent controlled contacts list. In this way, the parents can control who the child talks to, preventing the child from making contacts with individuals who may seek to harm children.

Figure 8:
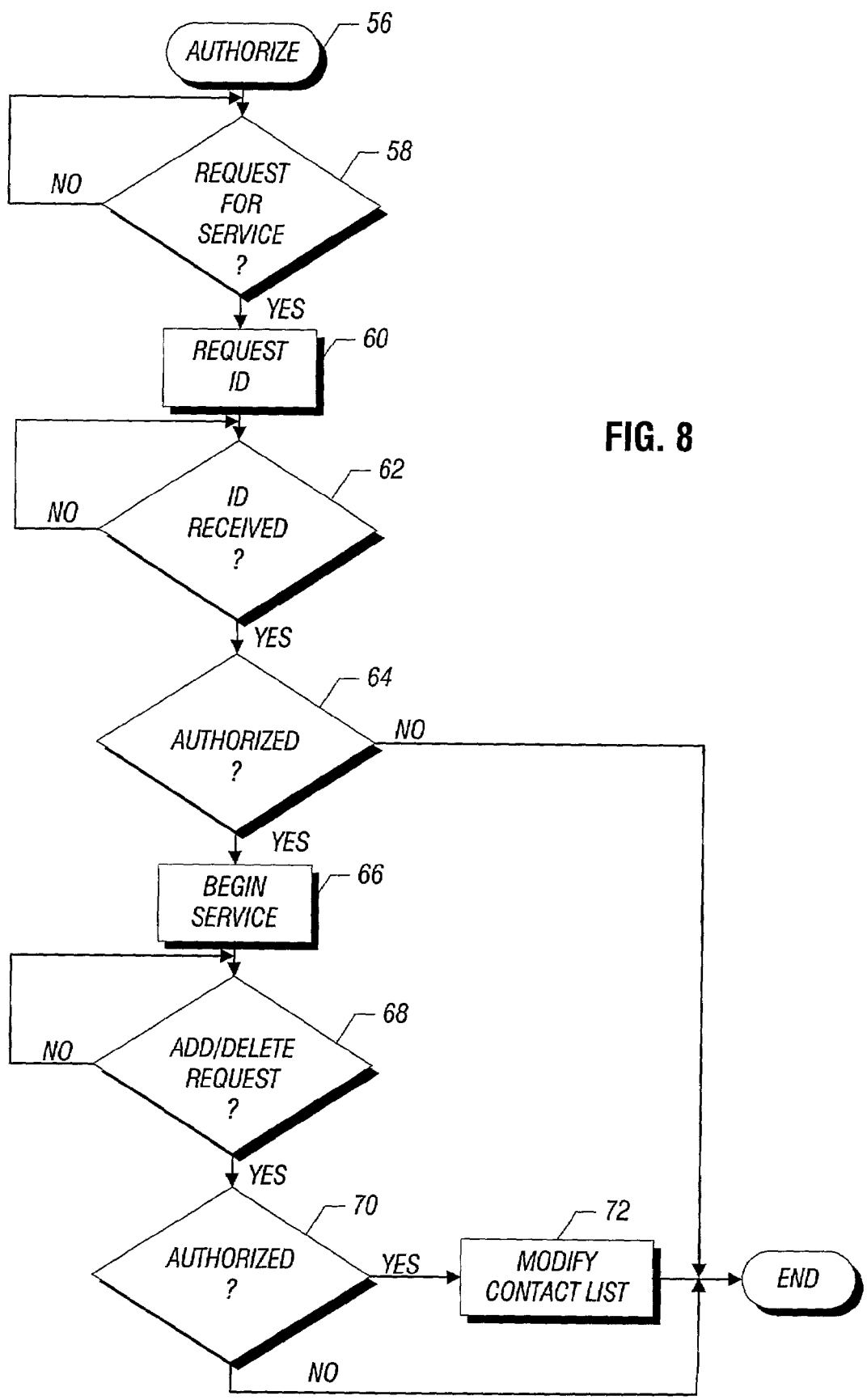
FIG. 8 is a flow chart for software in accordance with one embodiment of the present invention.

The software 56 stored on the device 10a controls the access to the device 10 and access to the contact list 46, as indicated in FIG. 8. The authorize software 56, in one embodiment of the present invention, awaits a request for service as indicated in diamond 58. Upon receiving a request for service, the password 44 is requested as indicated in block 60. When a response is received, as determined in diamond 62, a comparison is undertaken to see whether the entered password matches the password 44. If the user is authorized, as determined in diamond 64, service may begin as indicated in block 66. Otherwise, service is terminated.

Next a check at diamond 68 determines whether a request has been made to modify the contacts list 46. If so, the password 48 is requested. If the password 48 is provided, it is compared to the stored password 48. At diamond 70 the decision to change the contacts list is made. If the change is approved, the contact list may be modified (block 72) and thereafter the user of the device 10a may freely communicate with the added contacts list participant. Likewise, contacts that are currently on the list 46 may be deleted in the same fashion. Again, if the change is not authorized, the flow ends.

Figure 6:
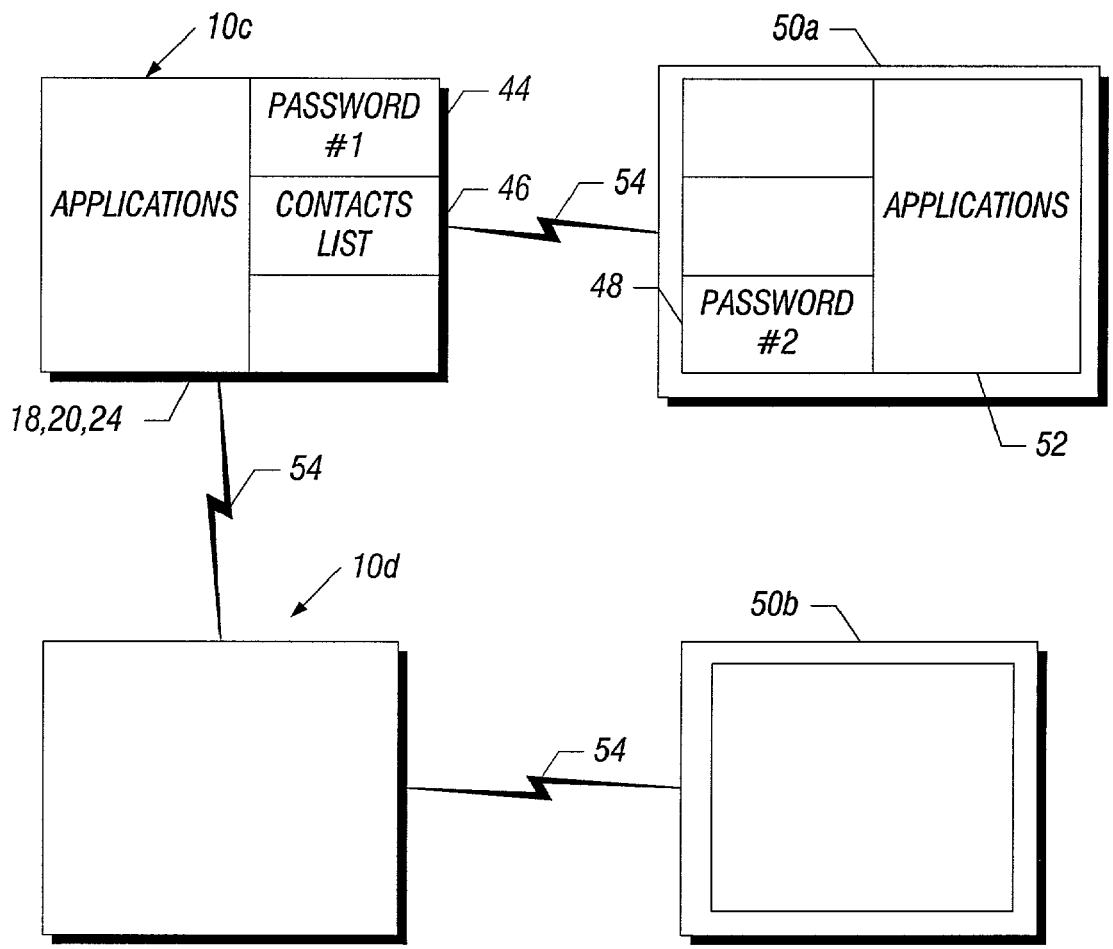
FIG. 6 is a schematic depiction of another embodiment of the present invention.

Moving to FIG. 6, in this embodiment, the contacts list change authorization may be done from a remote station. A remote station may be a personal computer in one embodiment that communicates wirelessly or through a hard-wired connection 54 with a device 10c. In this embodiment, it is not necessary for the person who authorizes the changes in the contact list 46 to physically utilize the device 10. Instead, a request for authorization can be provided over the link 54 to the station 50a, which then determines whether or not to authorize the request.

In some embodiments, the link 54 may be a wireless link. In other embodiments, it may be a hard-wired link, for example, in a docking station that receives the device 10c and provides the information requested from the device 10c to the station 50a. In this case, the password 48 for authorizing changes to the contact list 46 may be stored with the application 52 on the station 50a. Thus, communications may occur between the devices 10c and 10d as controlled by the contact list 46. In this case, the devices 10c and 10d are on the contact list 46. Likewise the device 10d may have a station 50b that controls access to the contacts list 46 using a password 48.

Figure 9:
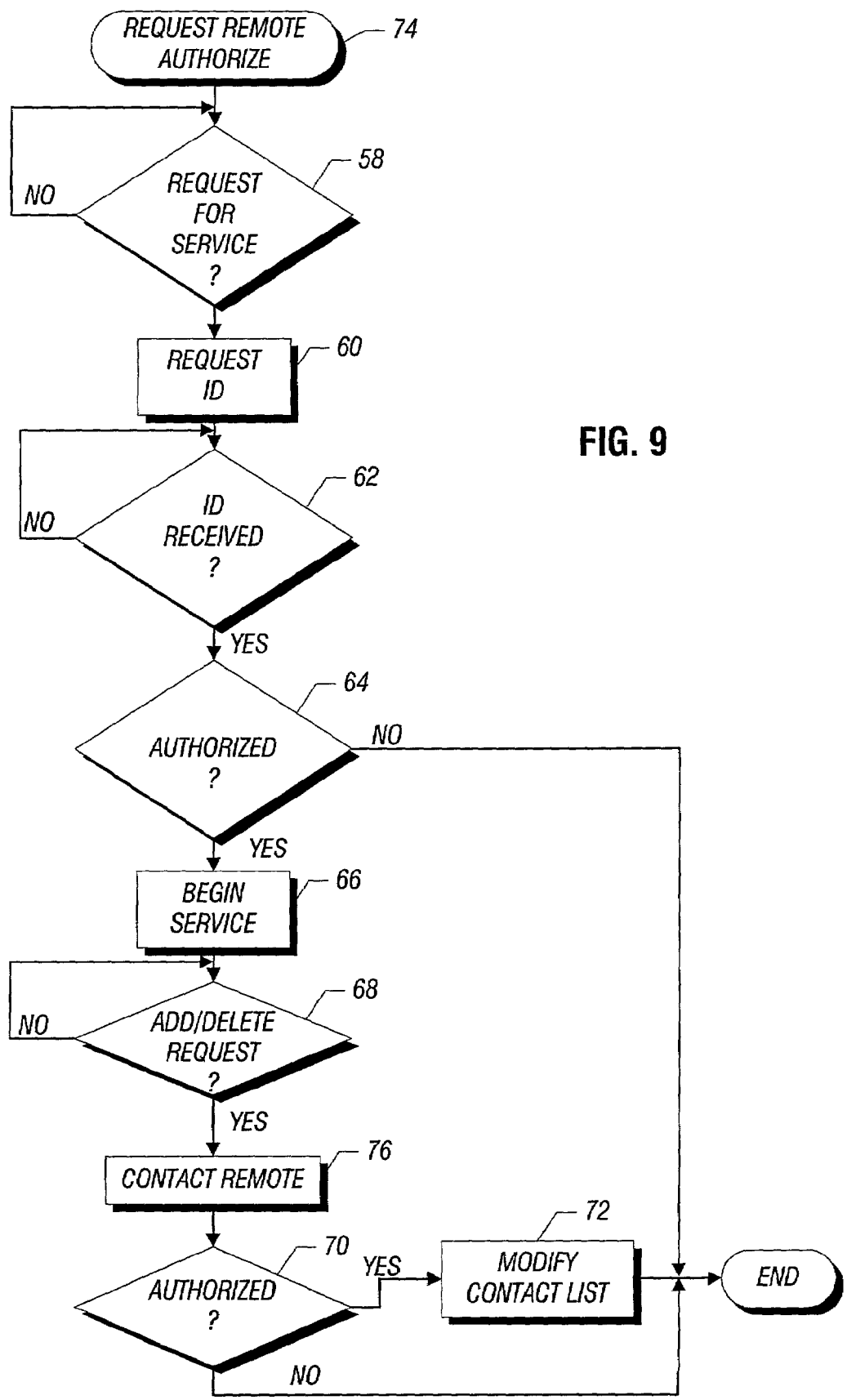
FIG. 9 is a flow chart for another embodiment of the present invention.

The software 74 shown in FIG. 9, stored on the devices 10c and 10d, begins with a request for service 58 followed by a request for a password or identifier as indicated at 60. A check at diamond 62 determines whether the password or identifier is received and if so, a check at diamond 64 determines whether the user is authorized. Thereafter, service may begin as indicated in block 66. When a request is made to modify the contact list, as determined in diamond 68, a remote station 50 may be contacted as indicated in block 76. The remote station then provides a signal indicating whether or not the modification of the list is authorized as indicated in diamond 70. If so, the contacts list may be modified as indicated in block 72. Otherwise, the change is refused.

Figure 10:
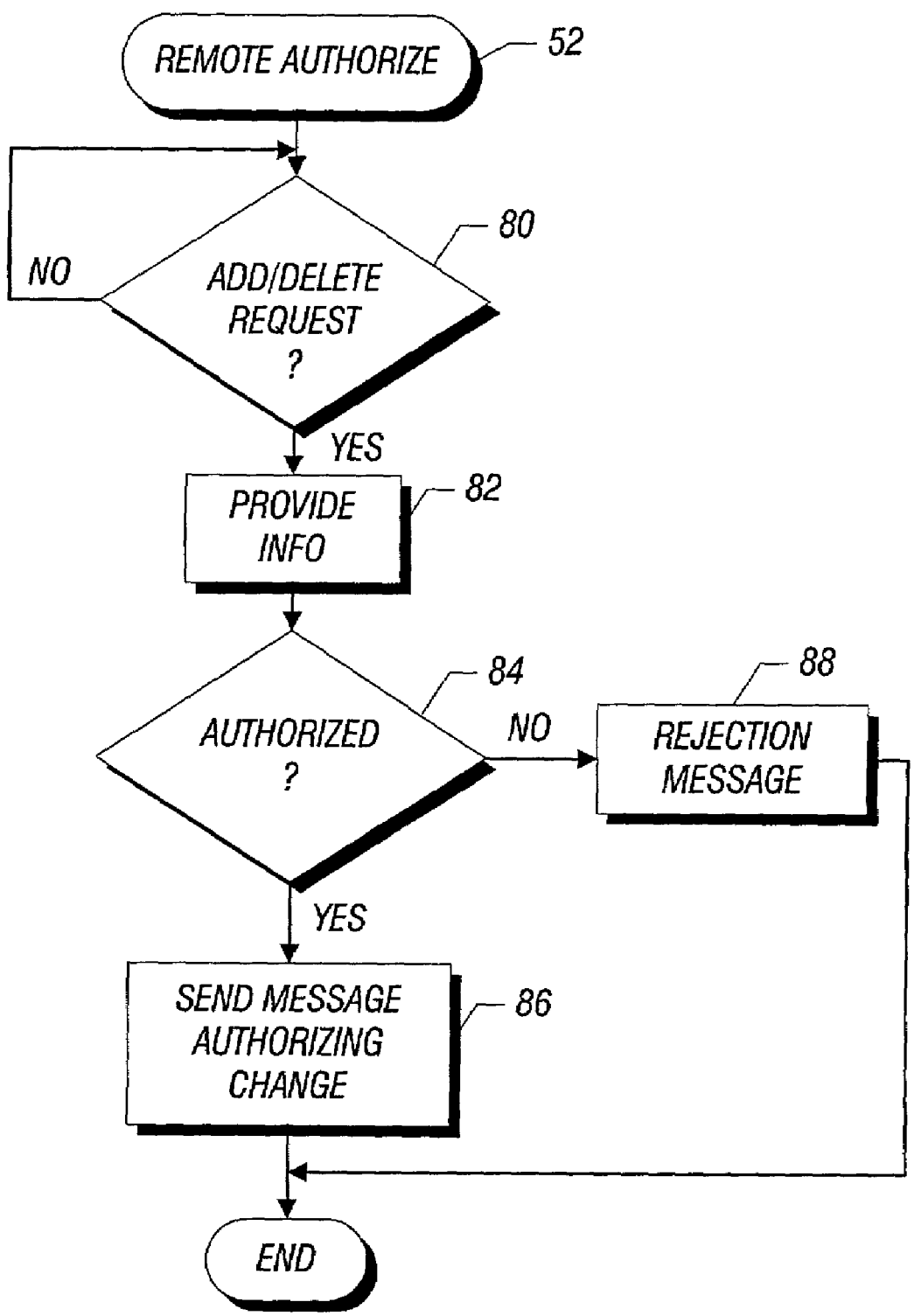
FIG. 10 is a flow chart for still another embodiment of the present invention.

The remote authorize software 52, shown in FIG. 10, on the stations 50a and 50b, begins with a request to modify the contacts list as indicated in diamond 80 in one embodiment of the present invention. Information may be provided over the link 54 indicating who the contact is in one embodiment. In other embodiments, a telephone or other communication may be required between the user of the device 10c and the user of the station 50a.

A check at diamond 84 determines whether the user of the station 50a wishes to authorize the modification to the contact list. If not, a rejection message 88 may be sent over the link 54 back to the device 10c. If the use is authorized, a message may be sent over the link 54 from the station 50a to the device 10c authorizing the change, as indicated at block 86.

In some embodiments an authentication protocol may be established between the devices 10c and 50a. In such case, a second password may be provided on the device 10c to authenticate and control access to a station 50 that allows such changes.

Figure 7:
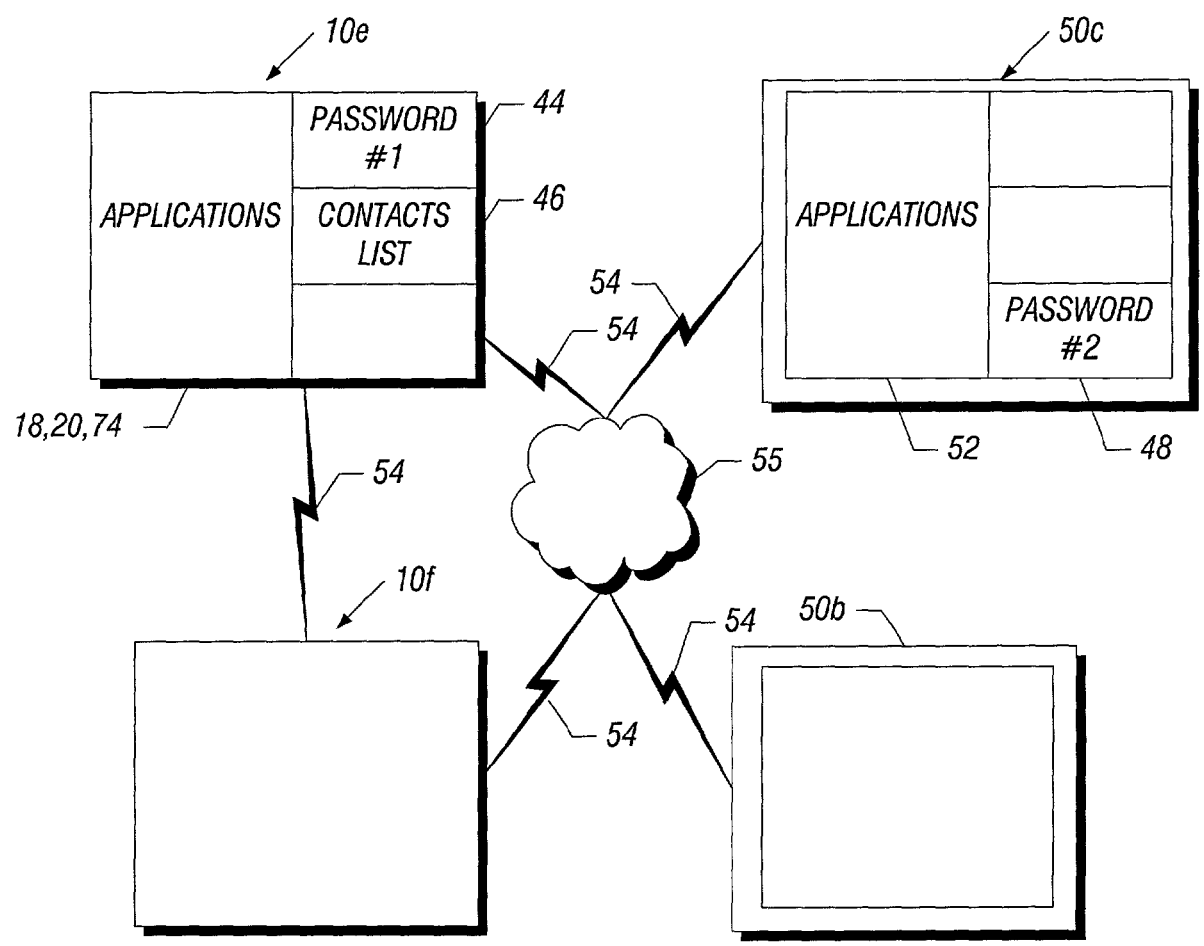
FIG. 7 is a schematic depiction of still another embodiment of the present invention.

Referring now to FIG. 7, in this case a device 10e may communicate with a station 50c for purposes of authorizing modifications to the contact list 46 over a network 55. In some embodiments, the network 55 may be the Internet or a cellular telephone network. In this way, the station 50c does not need to be in range of the device 10e in order to authorize modifications.

In one example, the device 10e may wish to communicate with a device 10f that is not currently on the contact list 46 of the device 10e. The device 10e may include the password 44 as described previously and applications 18, 20 and 74. When it is desired to modify the contact list 46, a request may be sent over the link 54 to the network 55, which then relays the message to a station 50c over a link 54. Likewise, a device 10f may follow the same communication protocol to reach its authorizing station 50d. If the change is authorized, the appropriate message is sent from a station 50 back to a device 10 modifying the contact list 46.

The actual implementation of the changes is otherwise similar to that described previously. However, in this case, the communications may be relayed through the network 55 extending the reach of the authorization process.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of establishing a mobile ad hoc network between a plurality of wireless mobile routers comprising:

exchanging predetermined contact lists between the plurality of mobile routers;

determining mutual common contacts of the predetermined contact lists; and establishing said mobile ad-hoc network only between those of the wireless mobile routers that have said mutual common contacts in their routing table, and wherein modification of said predetermined contact list is limited by entering a first password to enter a service and entering a second password to modify said predetermined contact list.

2. The method of claim 1 comprising:

requiring presentation of at least one of the first and second passwords to initiate communications with said plurality of wireless mobile routers.

3. The method of claim 1 comprising enabling modification of one or more of the predetermined contact lists from a remote location relative to said one or more wireless mobile routers.

4. The method of claim 3 comprising enabling a request for access to modify one or more of the predetermined contact lists to be communicated over the mobile ad hoc network.

5. The method of claim 4 comprising enabling a request for access to modify the one or more predetermined contact lists to be communicated over a telephone network.

6. The method of claim 4 comprising enabling a request for access to modify the one or more predetermined contact lists to be communicated over the Internet.

7. The method of claim 1 comprising:
obtaining said predetermined contact lists in at least one wireless mobile router of the plurality of mobile routers, having a predetermined contact list that includes a first mutual common contact of an in-range wireless mobile router and a second mutual common contact of an out-of-range mobile router;
automatically establishing a communication route from the wireless mobile router to the in-range wireless mobile route having said first mutual common contact; and
automatically establishing a communication route from the wireless mobile router to the out-of-range wireless mobile route having said second mutual common contact through the in-range wireless mobile route.

8. The method of claim 7 comprising:
automatically exchanging the predetermined contact list of the wireless router that has said first mutual contact with in-range wireless mobile routers;
comparing said predetermined contact lists;
identifying mutual common contacts in said contact list, storing the mutual common contacts in a routing table; and
establishing said ad-hoc network with wireless mobile routers that have said mutual common contacts within their routing tables.

9. An article comprising a medium storing instructions that enable a processor-based system to:
exchanging predetermined contact lists between the plurality of mobile routers;
determining mutual common contacts of the predetermined contact lists; and
establishing said ad-hoc network only between those of wireless mobile routers that have said mutual common contacts in their routing table, wherein modifying said predetermined contact list is limited by entering a first password to enter a service and entering a second password to modify said predetermined contact list.

10. The article of claim 9 further storing instructions that enable the processor-based system to require the presentation of a least one of the first and second passwords to initiate communications with said plurality of the mobile routers.

11. The article of claim 9 further storing instructions that enable the processor-based system to enable modification of the predetermined contacts list from a remote location relative to said one or more wireless mobile routers.

12. The article of claim 11 further storing instructions that enable the processor-based system to enable a request for access to modify the predetermined contacts list to be communicated over the mobile ad hoc network.

13. The article of claim 12 further storing instructions that enable the processor-based system to enable a request for access to modify the predetermined contacts list to be communicated over a telephone network.

14. The article of claim 12 further storing instructions that enable the processor-based system to enable a request for access to modify the predetermined contacts list to be communicated over the Internet.

15. The article of claim 9 further storing instructions that enable the processor-based system to obtain said predetermined contact lists in at least one wireless mobile router of the plurality of mobile routers, wherein said predetermined contact lists, includes a first mutual common contact of an in-range wireless mobile router and a second mutual common contact of an out-of-range mobile router, automatically establishing a communication route from the wireless mobile router to the in-range wireless mobile route having said first mutual common contact and automatically establishing a communication route from the wireless mobile router to the out-of-range wireless mobile route having said second mutual common contact through the in-range wireless mobile route.

16. The article of claim 15 further storing instructions that enable the processor-based system to automatically exchange said predetermined contact lists with in-range wireless mobile routers, comparing said predetermined contacts lists, identifying mutual common contacts in said contacts lists, storing the mutual common contacts in a routing table; and establishing said ad-hoc network of wireless mobile routers having said mutual common contacts within their routing tables.

17. A system comprising:
a processor;
a storage coupled to said processor storing instructions that enable the processor to:
operate a mobile ad hoc network between a plurality of wireless mobile routers;
exchanging a predetermined contact lists between the plurality of mobile routers;
determining mutual common contacts of the predetermined contact lists; and
establish said ad-hoc network only between wireless mobile routers that have said mutual common contacts in their routing table, wherein modification of said predetermined contact lists is limited by entering a first password to enter a service and entering a second password to modify said predetermined contact list.

18. The system of claims 17 wherein said storage stores instructions that enable the processor to require the presentation of at least one of the first and second passwords to initiate communications with said plurality of the mobile routers.

19. The system of claims 17 wherein said storage stores instructions that enable the processor to enable modification of the predetermined contacts list from a remote location relative to said one or more wireless mobile routers.

20. The system of claims 19 wherein said storage stores instructions that enable the processor to enable a request for access to modify the predetermined contacts list to be communicated over the mobile ad hoc network.

21. The system of claims 20, wherein said storage stores instructions that enable the processor to enable a request for access to modify the predetermined contacts list to be communicated over a telephone network.

22. The system of claims 20, wherein said storage stores instructions that enable the processor to enable a request for access to modify the predetermined contacts list to be communicated over the Internet.

23. The system of claims 17 wherein said storage stores instructions that enable the processor to obtain said predetermined contact lists in at least one wireless mobile router of the plurality of mobile routers, wherein said predetermined contacts list includes a first mutual common contact of an in-range wireless mobile router and a second mutual common contact of an out-of-range mobile router, automatically establishing a communication route from the wireless mobile router to the in-range wireless mobile route having said first mutual common contact and automatically establishing a communication route from the wireless mobile router to the out-of-range wireless mobile route having said second mutual common contact through the in-range wireless mobile route.

24. The system of claims 23 wherein said storage stores instructions that enable the processor to automatically exchange said predetermined contacts lists with in-range wireless mobile routers, comparing said predetermined contacts lists, identifying mutual common contacts in said contacts lists, storing the mutual common contacts in a routing table; and establishing said ad-hoc network of wireless mobile routers having said mutual common contacts within their routing tables.

* * * * *